(12) United States Patent
Steffes, Jr.

(10) Patent No.: US 10,124,963 B1
(45) Date of Patent: Nov. 13, 2018

(54) VIBRATORY APPARATUS

(71) Applicant: General Kinematics Corporation, Crystal Lake, IL (US)

(72) Inventor: Edward C. Steffes, Jr., Woodstock, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 0 days.

(21) Appl. No.: 15/720,541

(22) Filed: Sep. 29, 2017

(51) Int. Cl.
*B65G 27/16* (2006.01)
*B65G 27/20* (2006.01)
*B06B 1/16* (2006.01)
*B65G 27/32* (2006.01)

(52) U.S. Cl.
CPC .............. *B65G 27/20* (2013.01); *B06B 1/166* (2013.01); *B65G 27/32* (2013.01)

(58) Field of Classification Search
CPC ................................ B65G 27/20; B65G 27/16
USPC .............................. 198/752.1, 758, 759, 770
See application file for complete search history.

(56) References Cited

U.S. PATENT DOCUMENTS

| | | | |
|---|---|---|---|
| 3,089,582 A * | 5/1963 | Musschoot | B65G 27/18 198/761 |
| 3,358,815 A | 12/1967 | Musschoot et al. | |
| 3,677,395 A | 7/1972 | Musschoot | |
| 4,152,255 A | 5/1979 | Musschoot | |
| 4,218,929 A * | 8/1980 | Spurlin | B06B 1/161 198/770 |
| 4,424,718 A * | 1/1984 | Wadensten | B01F 11/0002 198/767 |
| 4,617,832 A | 10/1986 | Musschoot | |
| 5,054,606 A | 10/1991 | Musschoot | |
| 5,178,259 A * | 1/1993 | Musschoot | B06B 1/162 198/753 |
| 5,547,068 A * | 8/1996 | Spurlin | B65G 27/26 198/760 |
| 5,615,763 A | 4/1997 | Schieber | |
| 6,702,102 B2 | 3/2004 | Kraus et al. | |
| 7,240,800 B2 | 7/2007 | Musschoot et al. | |
| 7,712,513 B1 | 5/2010 | Mitchell | |
| 8,096,406 B1 | 1/2012 | Mitchell | |
| 9,238,229 B1 | 1/2016 | Kempf et al. | |
| 2003/0226742 A1* | 12/2003 | Didion | B65G 27/08 198/752.1 |
| 2005/0258017 A1* | 11/2005 | Thomson | B65G 27/20 198/752.1 |

* cited by examiner

*Primary Examiner* — James R Bidwell
(74) *Attorney, Agent, or Firm* — Cook Alex Ltd.

(57) ABSTRACT

A vibratory apparatus includes a trough assembly, an exciter assembly and first and second toroidal members. The trough assembly includes a trough and first and second walls attached to the trough with a space disposed therebetween. The exciter assembly includes a central mount with first and second opposite sides and first and second opposite ends, and first and second eccentric assemblies each including at least one motor having a shaft with a shaft axis and at least one eccentric attached to the shaft for rotation about the shaft axis, the first eccentric assembly attached to the first end and the second eccentric assembly attached to the second end. The first toroidal resilient member is disposed between the first wall and the first side and the second toroidal resilient member is disposed between the second wall and the second side, with the exciter assembly disposed in the space.

15 Claims, 7 Drawing Sheets

US 10,124,963 B1

VIBRATORY APPARATUS

BACKGROUND

This patent is directed to a vibratory apparatus having at least two eccentric assemblies resiliently mounted to a deck, the operation of the two eccentric assemblies causing material to move relative to the deck.

Certain vibratory apparatuses are built by attaching an eccentric assembly directly to a trough, and operating the eccentric assembly to cause movement of materials in the trough relative to the trough. For example, a pair of motors may be fixedly attached to a trough, with at least one eccentric attached to each of the motors. By varying the operation of the motors (e.g., turning one off while the other is one), materials may be moved from one end of the trough to the other.

In the alternative, the motors may be attached to the trough through a coil spring, for example. This arrangement (also referred to as a two-mass system) may have advantages relative to the arrangement where the motors are attached directly to the trough (also referred to as a single mass, or brute force, system). Less energy may be required, because energy is used and stored in the springs. The two-mass system may also be more flexible in addressing changes in material, such as weight or density.

While two-mass systems may provide certain advantages over single-mass systems, not all two-mass configurations provide the same performance, and certain two-mass configurations provide advantages over other two-mass configurations It would be advantageous to overcome or substantially ameliorate one or more of the disadvantages of existing two-mass vibratory apparatuses in a two-mass configurations of novel and inventive design and/or control, or at least to provide a useful alternative.

SUMMARY

According to one aspect of the present disclosure, a vibratory apparatus includes a trough assembly, an exciter assembly and first and second toroidal members. The trough assembly includes a trough, and first and second walls attached to the trough with a space disposed therebetween. The exciter assembly includes a central mount with first and second opposite sides and first and second opposite ends, and first and second eccentric assemblies that each include at least one motor having a shaft with a shaft axis and at least one eccentric attached to the shaft for rotation about the shaft axis, the first eccentric assembly attached to the first end of the central mount and the second eccentric assembly attached to the second end of the central mount. The first toroidal resilient member is disposed between the first wall of the trough assembly and the first side of the central mount and the second toroidal resilient member is disposed between the second wall of the trough assembly and the second side of the central mount with the exciter assembly disposed in the space between the first and second walls.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings is necessarily to scale.

DETAILED DESCRIPTION OF VARIOUS EMBODIMENTS

A vibratory apparatus according to embodiments of the present disclosure is illustrated in FIGS. 1-6.

The vibratory apparatus 100 includes a trough assembly 102, an exciter assembly (or exciter) 104, and toroidal resilient members 106, 108 (see FIGS. 4, 6) used to couple the exciter assembly 104 to the trough assembly 102. As so configured, the vibratory apparatus 100 is a two-mass vibratory apparatus, with the trough assembly 102 defining one of the two masses, and the exciter assembly 104 defining the other of the two masses.

Figure 1:
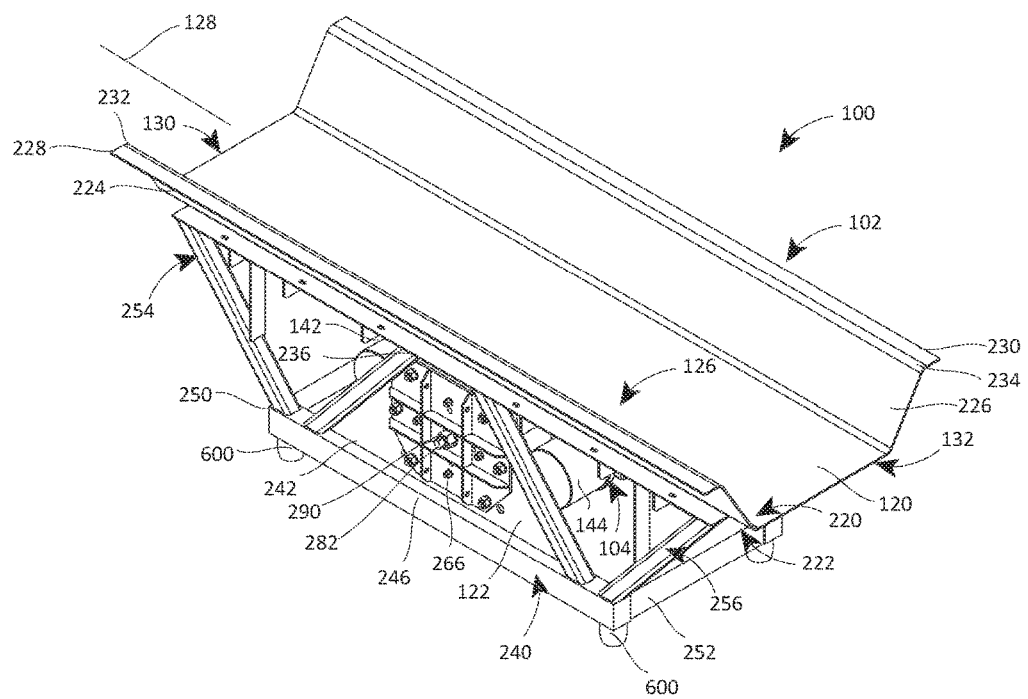
FIG. 1 is a perspective view of an embodiment of a vibratory apparatus.
Figure 4:
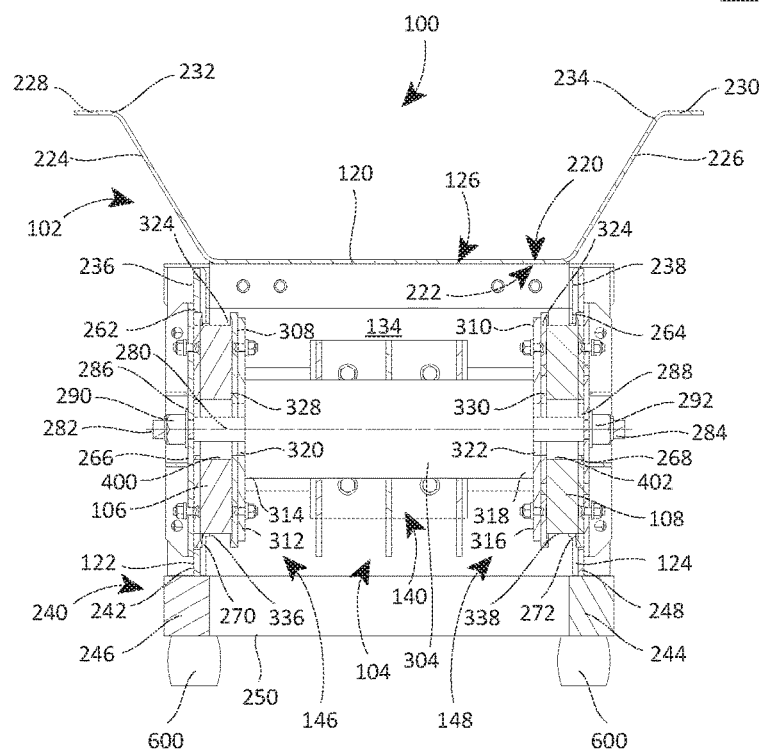
FIG. 4 is a cross-sectional view of the vibratory apparatus of FIG. 1 taken along line 4-4 in FIG. 2.
Figure 6:
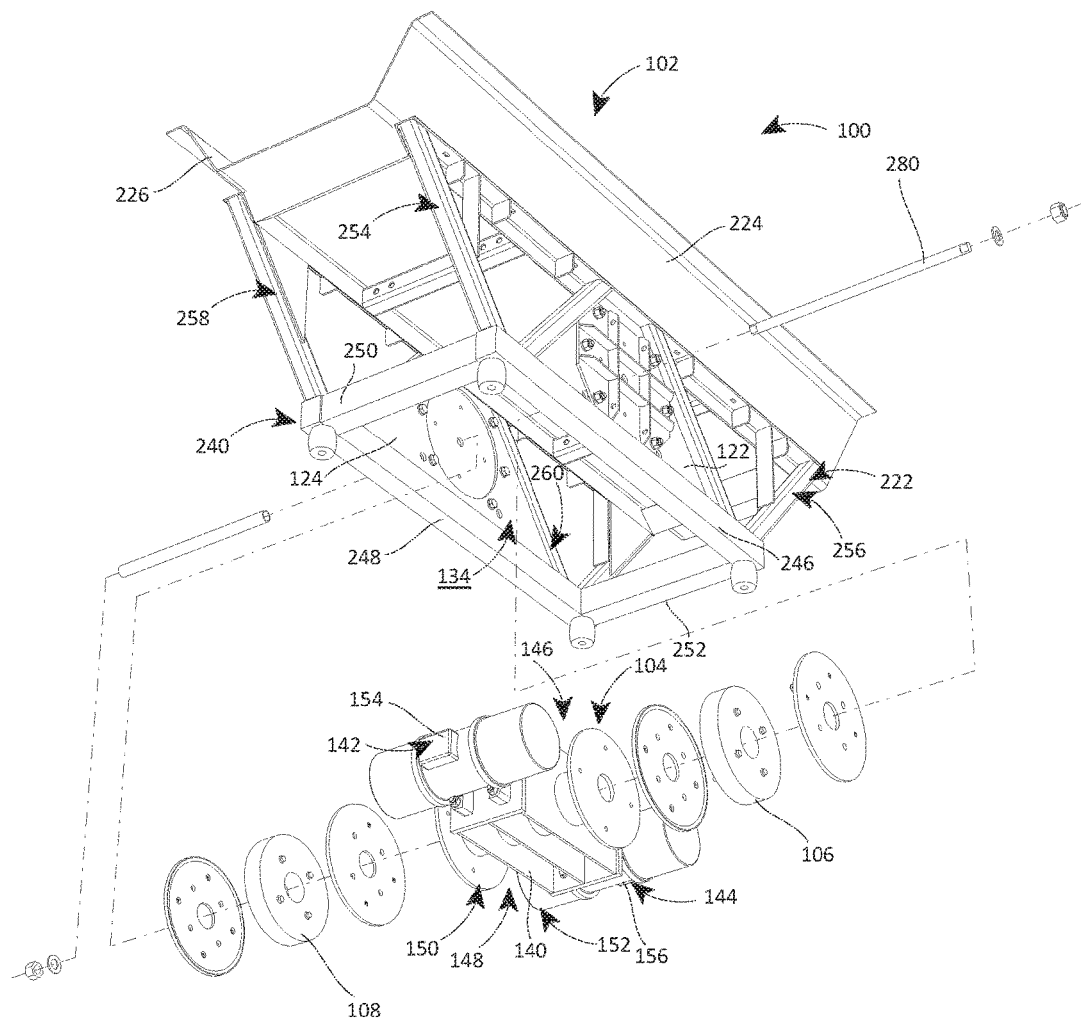
FIG. 6 is a partial exploded view of the vibratory apparatus of FIG. 1.

In general terms, the trough assembly 102 includes a trough 120 and a pair of walls 122, 124 (see, e.g., FIGS. 1, 4, 6). The trough 120 defines a deck 126 having a longitudinal axis 128 from a first end 130 to a second, opposite end 132 (see FIG. 1). As illustrated, the trough 120 defines a single deck 126, although according to other embodiments more than one deck may be defined by the trough 120. The pair of walls 122, 124 includes a first wall 122 and a second wall 124, which walls 122, 124 are attached to the trough 120 with a space 134 disposed therebetween (see FIGS. 4, 6).

Figure 5:
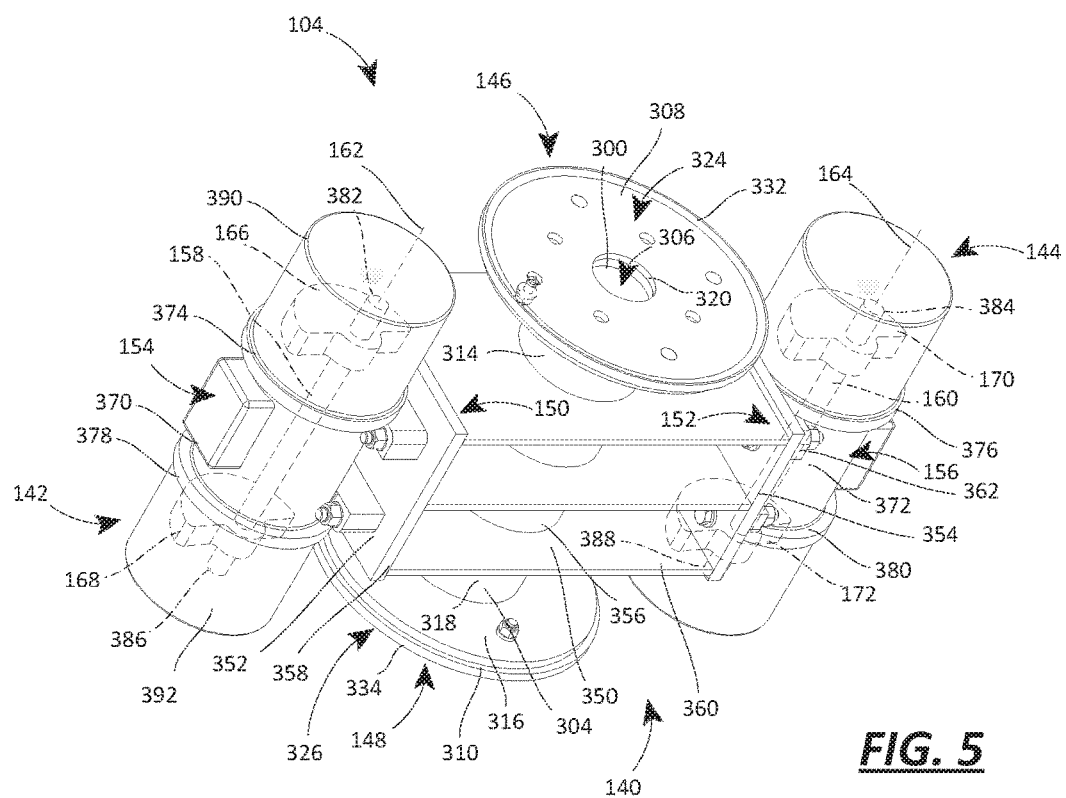
FIG. 5 is a perspective view of an embodiment of an exciter assembly for use in the vibratory apparatus of FIG. 1.

In similar general terms, the exciter assembly 104 includes a central mount 140 and a pair of eccentric assemblies 142, 144 (see FIG. 5). The central mount 140 has first and second opposite sides 146, 148 and first and second opposite ends 150, 152. The first and second eccentric assemblies 142, 144 each include at least one motor 154, 156 having a shaft 158, 160 with a shaft axis 162, 164 and at least one eccentric 166, 168, 170, 172 attached to the shaft 158, 160 for rotation about the shaft axis 162, 164. The first eccentric assembly 142 is attached to the first end 150 of the central mount 140, and the second eccentric assembly 144 is attached to the second end 152 of the central mount 140.

The exciter assembly 104 is disposed in the space 134 between the first and second walls 122, 124 (see FIG. 4). Further, the first toroidal resilient member (or toroidal spring) 106 is disposed between the first wall 122 of the trough assembly 102 and the first side 146 of the central mount 140. In addition, the second toroidal resilient member (or toroidal spring) 108 is disposed between the second wall 124 of the trough assembly 102 and the second side 148 of the central mount 140.

Figure 7:
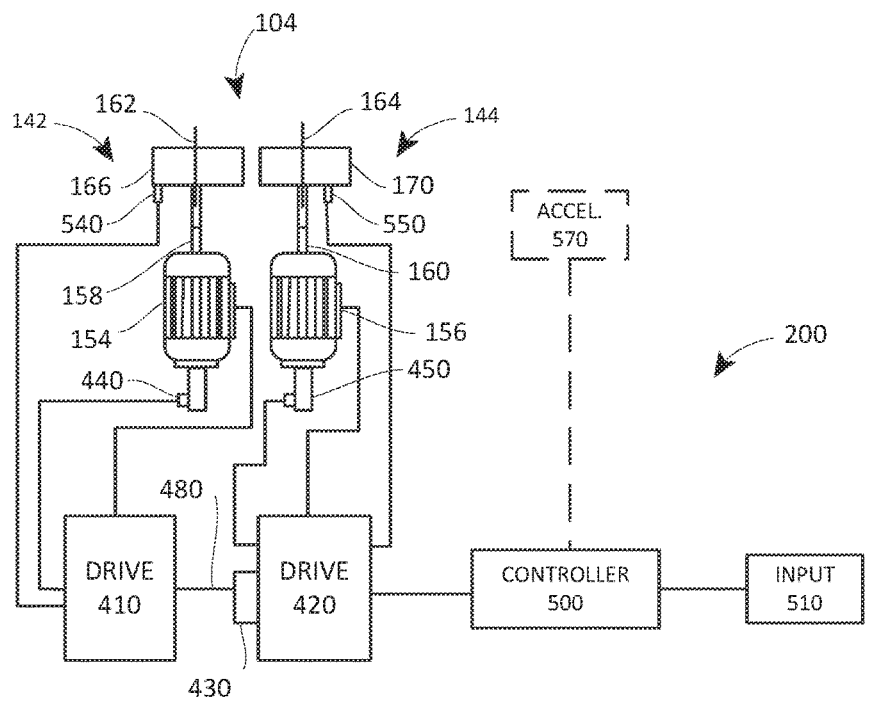
FIG. 7 is a schematic view of a control system for use with the vibratory apparatus of FIG. 1.
Figure 11:
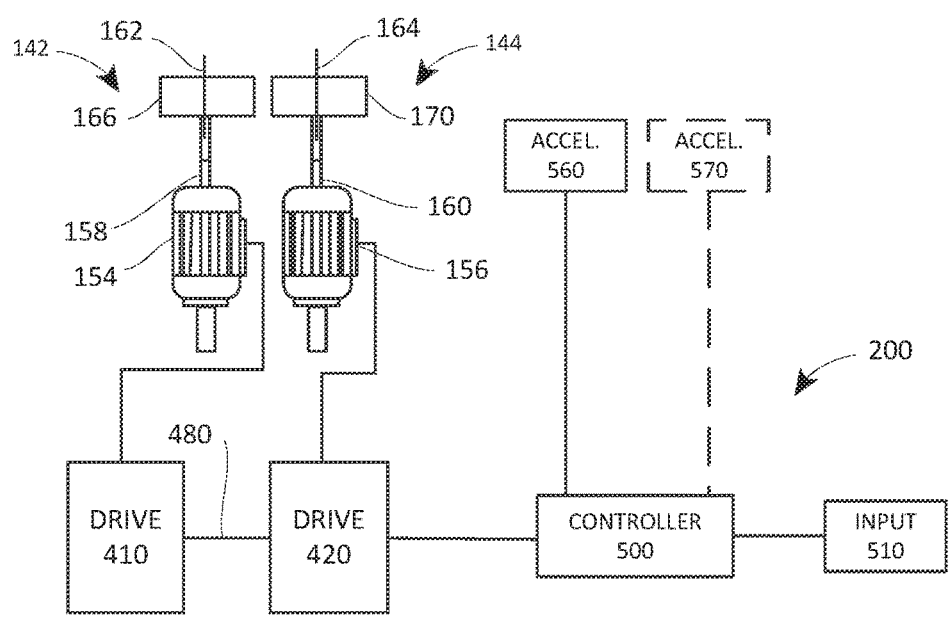
FIG. 11 is a schematic view of another control system for use with the vibratory apparatus of FIG. 1.

The vibratory apparatus 100 may also include a control system 200 coupled to the at least one motor 154 of the first eccentric assembly 142 and the at least one motor 156 of the second eccentric assembly 144 (see FIGS. 7 and 11). This control system 200 is coupled to a sensor associated with one of the trough assembly 102 and the exciter assembly 104. The control system 200 is configured to vary the operation of at least one motor 154, 156 of at least one of the first and second eccentric assemblies 142, 144 to change an angle of attack generated by the exciter assembly 104 in conjunction with a feedback signal provided by the sensor.

Having thus described the general structure of the vibratory apparatus 100, the details of structure and operation of the embodiments of the apparatus shall now be discussed.

Starting with FIG. 1, the trough assembly 102 includes the trough 120 that defines the deck 126. As illustrated, the deck 126 is solid, i.e., there are no apertures or holes that depend through the deck 126 through which material may pass through the deck 126. Alternatively, the deck 126 may be foraminous over at least a portion of its length between the first and second ends 130, 132. According to those embodiments where more than one deck may be provided, one deck may be solid while one or more other decks are foraminous. Further, the deck (whether solid or foraminous) may be textured or otherwise surface-treated.

The deck 126 may be disposed on an upper surface 220 of the trough 120, while the first and second walls 122, 124 may be attached to a lower surface 222 of the trough 120 (see also FIGS. 4, 6). The trough 120 may also include first and second walls 224, 226 that depend from the upper surface 220 of the trough 120. According to one embodiment (not shown), the same structural element (e.g., plate) may define the first upper wall 224 and the first lower wall 122 and/or the second upper wall 226 and the second lower wall 124.

The first and second walls 224, 226 that depend from the upper surface 220 may be attached to the deck 126 such that the first and second walls 224, 226 and the deck 126 are integral (i.e., one piece); alternatively, the first and second walls 224, 226 may be separate from the deck 126 and attached to the deck 126 by welding, for example. Further, only the first or the second wall 224, 226 may be included, or both walls 224, 226 may be omitted. A lip 228, 230 may be provided at an upper edge 232, 234 of the walls 224, 226, as illustrated, according to certain embodiments.

According to the illustrated embodiment, the first and second walls 224, 226 demark the width of the deck 126 in a direction transverse to the longitudinal axis 128 between the first and second ends of the deck 130, 132. Further, the first and second walls 224, 226 depend from the upper surface 220 at an angle to the deck 126, such that the distance between the first and second walls 224, 226 is greater the further from the deck 126 the walls 224, 226 depend (see FIGS. 3, 4). On the other hand, the first and second walls 122, 124 that depend from the lower surface 222 are generally parallel to each other and to the longitudinal axis 128 (see, e.g., FIG. 4). According to other embodiments, the walls 122, 124 also may diverge from or converge toward each other the further the walls 122, 124 depend from the lower surface 222.

Figure 2:
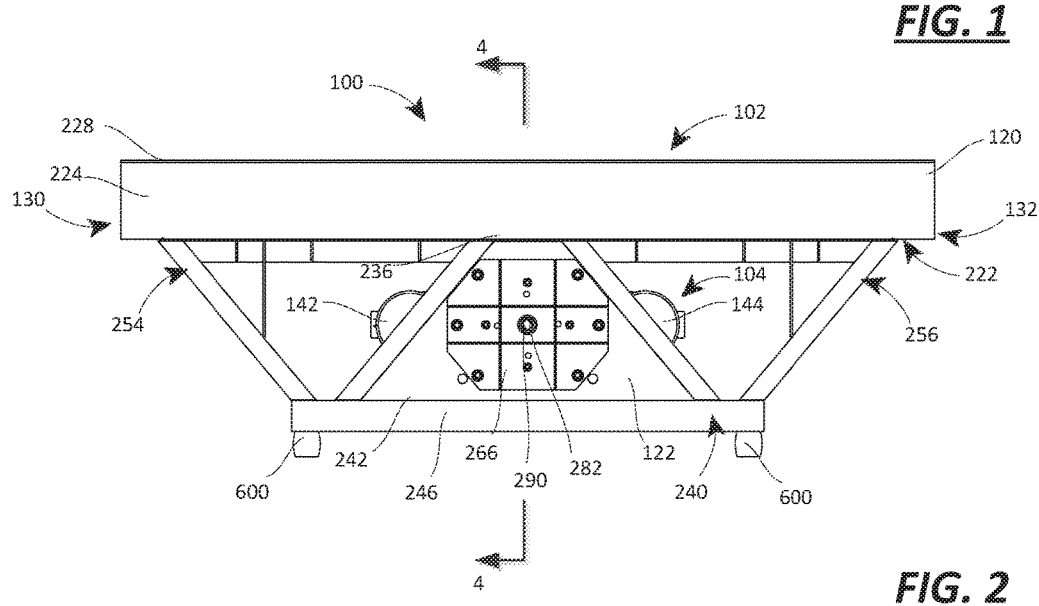
FIG. 2 is a side view of the vibratory apparatus of FIG. 1.

Turning now to FIG. 4, the first and second walls 122, 124 may be attached to the trough 120 along an upper edge 236, 238 and to a frame 240 along a lower edge 242, 244 (see also FIGS. 1, 2, 6). The frame 240 may include support beams 246, 248 that are parallel to the longitudinal axis 128 of the trough 120, and crossbeams 250, 252 that are transverse to the longitudinal axis 128 of the trough 120 (see FIGS. 1, 6). The frame 240 may assist in strengthening the walls 122, 124, as may two pairs of support beams 254, 256, 258, 260 arranged in two upward-opening V shapes or trusses on either side of the walls 122, 124 (see FIGS. 1, 2, 6). The walls 122, 124 may be trapezoid in shape to accommodate the trusses 254, 256, 258, 260 at either side.

Additional support beams and cross beams may be incorporated to the vibratory apparatus, as may be seen in FIG. 6.

As illustrated in FIG. 4, each wall 122, 124 may include an opening 262, 264 through which one of the toroidal springs 106, 108 is disposed to couple the exciter assembly 104 to the trough assembly 102. A cover plate 266, 268 (generally octagonal as illustrated—see FIGS. 1, 2, 6) is attached to the wall 122, 124 (through the use of removable fasteners, such as nuts and bolts) over the opening 262, 264 so that the toroidal spring 106, 108 is disposed between an inner surface 270, 272 of the cover plate 266, 268 and the respective side 146, 148 of the central mount 140. As illustrated, each cover plate 266, 268 is attached to the wall 122, 124 with six fasteners disposed about the periphery of the cover plate 266, 268.

The trough assembly 102 also includes a shaft 280 that depends between a first end 282 at the first wall 122 and a second end 284 at the second wall 124 (see also FIGS. 1, 2. More particularly, the shaft 280 is received in a central aperture 286, 288 in each of the cover plates 266, 268, which are themselves generally centered on the walls 122, 124.

The shaft 280 may have a fastener 290, 292 disposed at the first end 282 and/or the second end 284 of the shaft 280, which fastener 290, 292 may be adjustable. By varying the position of the fastener(s) 290, 292 at the first and second ends 282, 284 of the shaft 280, the first and second walls 122, 124 may be drawn toward each other (and toward the toroidal springs 106, 108 and the central mount 140 disposed in the space 134 between the walls 122, 124).

For example, the shaft 280 may be threaded at both ends 282, 284, and a fastener 290, 292 in the form of a nut having an internal threading may be disposed on both ends 282, 284. By adjusting the nut 290, 292 relative to the shaft 280, the walls 122, 124 may be drawn toward each other, and toward any structures, such as the toroidal springs 106, 108 and central mount 140, which may be disposed therebetween.

The cover plates 266, 268 also may include other structures, such as reinforcements, in addition to the structures described above.

Turning next to the exciter assembly 104, the assembly 104 includes the central mount 140 and pair of eccentric assemblies 142, 144 mentioned above.

As illustrated in FIG. 5, the central mount 140 has a passage 300 that extends between the first and second sides 146, 148 of the central mount 140. The shaft 280, mentioned above, is disposed through the passage 300 with the central mount 140 disposed in the space 134 between the first and second walls 122, 124 (see FIG. 4). The passage 300 may be defined, at least in part by an inner surface of a tube or tubular structure 304 that depends between the first and second sides 146, 148 of the central mount 140, the inner surface bounding an inner space 306.

The tube 304 may be in the form of a round cylinder, as illustrated, although the tube 304 may take on other forms as well. For example, the tube 304 may have a cross-section that is other than circular; the cross-section may be oval, square or rectangular, for example.

The central mount 140 also may include a first side plate 308 disposed on the first side 146 and a second side plate 310 disposed on the second side 148, both of which are circular as illustrated. As illustrated, the first circular plate 308 may be attached on a first surface 312 to a first end 314 of the tube 304, while the second circular plate 310 may be attached on a first surface 316 to a second end 318 of the tube 304 (see also FIG. 4). Each of the first and second plates 308, 310 may have an opening 320, 322 disposed therethrough that is aligned with the inner space of the tube 304 to permit the shaft 280 to pass through one of the plates 308, 310, the tube 304, and the other of the plates 308, 310.

Each of the plates 308, 310 has a second surface 324, 326 that is configured to have a surface 328, 330 of the toroidal spring 106, 108 abutting it. That is, the surface 324, 326 abuts either directly or indirectly the toroidal spring 106, 108 (e.g., there may be a layer of material between the surface of the plate 308, 310 and the toroidal spring 106, 108). As illustrated, the surface is 324, 326 bounded by a peripheral edge 332, 334 such that a diameter taken at the peripheral edge 332, 334 is equal to or greater than a diameter taken at an outermost edge 336, 338 of the toroidal spring 106, 108. According to other embodiments, the diameter of the circular plate 308, 310 may be smaller than the diameter of the toroidal spring 106, 108.

The central mount 140 may also include a first set of one or more plates 350 that depend between the ends 150, 152 of the central mount 140 and a second set of one or more cross plates 352, 354 that are transverse to the first set of plates 350. Each of the first set of plates 350 may have an opening 356 therethrough in which the tube 304 is disposed. The plates 350 may be attached to the tube 304 by welding, for example. As illustrated, each of the first set of plates 350 has a first end 358 that is attached (again, by welding, for example) to a first cross (or end) plate 352 and a second end 360 that is attached to a second cross (or end) plate 354.

One or more mounts 362 are used to attach the first and second eccentric assemblies 142, 144 to the end plates 352, 354. As illustrated, there are two mounts 362 used to attach the first and second eccentric assemblies 142, 144 to the end plates 352, 354. As illustrated, the mounts 362 may be removably attached to the end plates 352, 354 so as to permit the eccentric assemblies 142, 144 to be detached for servicing, for example. According to other embodiments, the mounts 362 may be fixedly attached to the end plates 352, 354, and removably attached to the eccentric assemblies 142, 144.

Each of the eccentric assemblies 142, 144 includes at least one motor 154, 156 and at least one eccentric 166, 168, 170, 172 attached to the shaft 158, 160 of the at least one motor 154, 156. As illustrated, each of the eccentric assemblies 142, 144 includes one motor 154, 156 having a motor casing 370, 372 with a first end 374, 376 and a second end 378, 380, and the motor shaft 158, 160 has a first end 382, 384 that depends beyond the first end 374, 376 and a second end 386, 388 that depends beyond the second end 378, 380 of the motor casings 370, 372. At least one eccentric 166, 168, 170, 172, in the form of a weight or mass in the shape of a sector of a circle for example, is attached to each of the first and second ends 382, 384, 386, 388 of the motor shafts 158, 160. A cup-shaped cover 390, 392 is disposed over the first and second motor shaft ends 382, 384, 386, 388 and their respective eccentrics 166, 168, 170, 172 to prevent contact with the ends 382, 384, 386, 388 and eccentrics 166, 168, 170, 172.

It will be recognized that the eccentrics illustrated are but one possible eccentric that may be used in the above-mentioned exciter assembly. For example, the masses described above have a fixed shape, and thus have a center of mass that is a fixed distance from the center of the motor shaft. As an alternative, each eccentric may include a mass that may be disposed at a variable distance from the center of the motor shaft. For example, the eccentric may include a pneumatic system that varies the distance of a moveable mass relative to the center of the motor shaft. See, for example, U.S. Pat. Nos. 3,358,815, 4,617,832 and 9,238,229, the entirety of each of which is hereby incorporated by reference herein.

Figure 3:
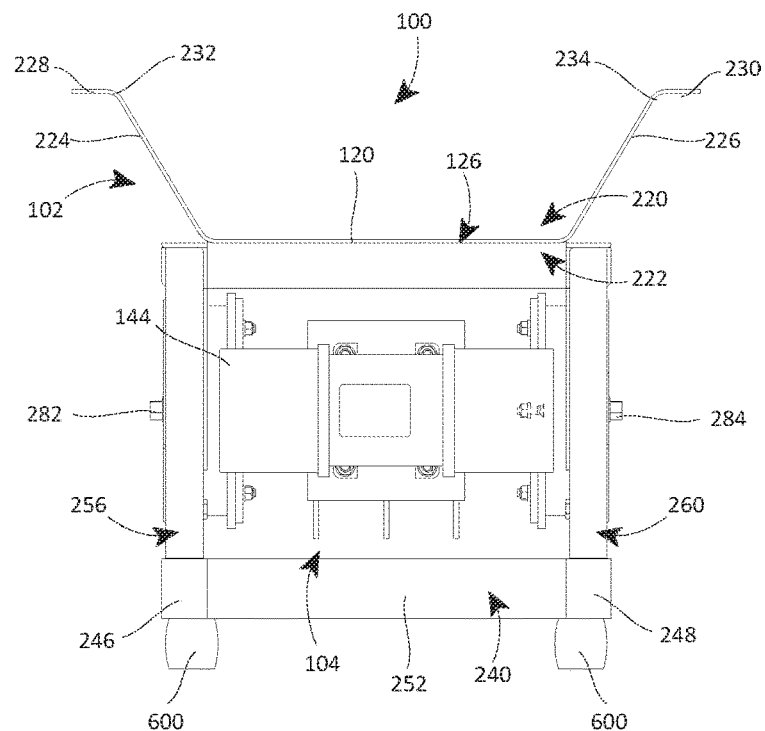
FIG. 3 is an end view of the vibratory apparatus of FIG. 1.

As is illustrated, the shafts 158, 160 of the motors 154, 156 of the first and second eccentric assemblies 142, 144 are transverse the longitudinal axis 128 of the trough 120 (see FIGS. 3, 5). When in operation, materials may be moved along the deck 126 between the first end 130 and the second end 132. For example, the materials may move from the first end 130 to the second 132 and/or from the second end 132 to the first end 130. The material also may be deposited at the center of the deck 126 and moved in either direction. As a further example, the material may move toward neither end 130, 132, but instead move in a generally vertical direction.

As mentioned above, the exciter assembly 104 is coupled to the trough assembly 102 by the toroidal springs 106, 108, so as to define a two-mass apparatus. The toroidal springs 106, 108 may be made of either a natural (e.g., rubber) or synthetic material, or a composite thereof. The springs 106, 108 each may have a passage 400, 402 therethrough (see FIG. 4), and the shaft 280 is disposed through the passage 300 of the central mount 140 and the passages 400, 402 of the first and second toroidal resilient members 106, 108 with the central mount 140 disposed in the space 134.

It will be understood that the trough assembly has a center of gravity, as does the exciter assembly. Moreover, each of the toroidal springs has a spring axis. According to embodiments of the vibratory apparatus, the center of gravity of the trough assembly, the center of gravity of the exciter assembly and the center of the first and second toroidal resilient members are the same (at least in an unloaded state).

As illustrated schematically in FIG. 7, the apparatus 100 may also include a control system 200, which system 200 is coupled to the exciter assembly 104, and in particular the first eccentric assembly 142 and the second eccentric assembly 144. In this regard, certain portions of the eccentric assemblies 142, 144 have been illustrated schematically in FIG. 7. For example, while eccentrics 166, 168 are attached to the first motor shaft 158 and eccentrics 170, 172 are attached to the second motor shaft 160, only one eccentric 166, 170 is illustrated in FIG. 7 as attached to each shaft 158, 160 to simplify the drawing.

In the absence of an intervening action from the control system 200, the two motors 154, 156 would align themselves in phase with each other so that the resultant force passes through a line connecting the shafts 158, 160 and a line passing through the center of gravity of the vibrating mass (vibratory apparatus 100). However, if the rotation of the shafts 158, 160 is controlled such that the angular relationship of the eccentric shafts/weights 166, 170 is maintained at other than in phase, then this will cause the resultant line of force to change direction, thus changing the direction of product flow along or relative to the deck 126 of the vibratory apparatus 100.

To this end, the control system 200 includes a first variable frequency drive (VFD) 410 coupled to the first motor 154 and a second variable frequency drive 420 coupled to the second motor 156. Each drive 410, 420 independently controls the shaft position (and consequently the speed) of the respective motor 154, 156 and thus the position (and consequently the speed) of the shaft 158, 160.

One drive 410 is designated the slave, and the other drive 420 is designated the master. The master/slave designation is based on the location of a virtual drive in the positioning software of a module 430 associated with of one of the drives. According to the present embodiment, the module 430 may be in the form of a card, having on-board processing capability and memory, that is placed in a card slot in the drive 420, for example.

The first drive 410 is coupled to a first encoder 440 that is connected to the first eccentric 166, and the second drive 420 is coupled to a second encoder 450 connected to the second eccentric 170. In particular, the first encoder 440 is connected directly to the first motor shaft 158 (or more particular, the back shaft of the first motor 154), and the second encoder 450 is connected directly to the second motor shaft 160 (or more particularly, the back shaft of the second motor 154).

Figure 8:
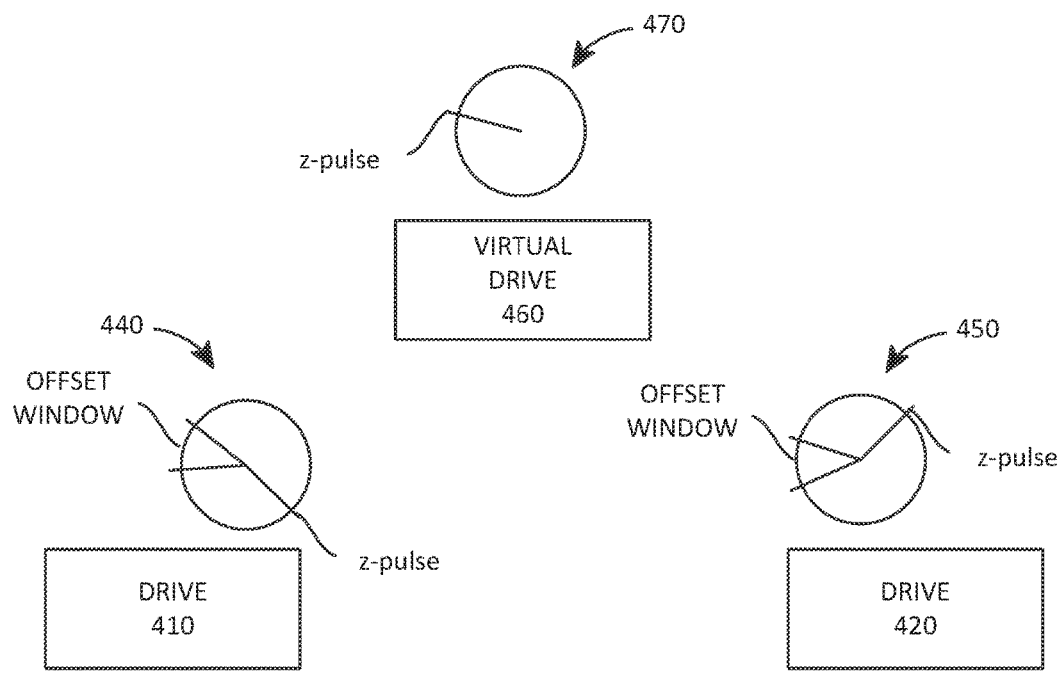
FIG. 8 is a representation of the operation of the drives of the control system of FIG. 7.

The first and second encoders 440, 450 may be digital encoders, and may each have a 'home' signal, referred to herein as the z-pulse, that occurs once per revolution of the shaft (represented schematically in FIG. 8). The drives 410, 420 may each use their respective encoder 440, 450 to establish counts relative to their respective z-pulses to determine the positions of the respective shafts 158, 160. The drives 410, 420 may also use the encoders 440, 450 to establish counts relative to external signals as well.

In particular, the module 430 may be configured to provide a virtual drive 460 with a virtual encoder 470, and the virtual encoder 470 may have a virtual z-pulse associated therewith (also represented schematically in FIG. 8). The drives 410, 420 may use the virtual z-pulse in a comparison with the z-pulses of their respective encoders 440, 450 to determine if the drives 410, 420 are maintaining a desired relationship with the virtual drive 460. The first drive 410 is configured to compare the virtual encoder 470 to the first encoder 440, and maintain a first offset between the first encoder 440 and the virtual encoder 470. Similarly, the second drive 430 is configured to compare the virtual encoder 470 to the second encoder 450, and maintain a second offset between the second encoder 450 and the virtual encoder 470.

For example, the encoder 440 may maintain a count from the point in time of its own z-pulse to the point in time that the drive 410 receives the z-pulse from the virtual encoder 470. The drive 410 may then compare the count determined between the z-pulse of the encoder 440 to the z-pulse of the encoder 470 against the first offset. Assuming that the count is within an acceptable range, or window, relative to the first offset (see FIG. 8), then the drive 410 may determine that the motor 154 is operating in an acceptable manner. However, if the count falls outside of the window taken relative to the first offset, the drive 410 may determine that the motor 154 is not operating in an acceptable manner. In such a case, the drive 410 may signal the motor 154 to speed up or slow down so that the count will again be within the window taken relative to the first offset.

It will be recognized that the second drive 420 may operate in a similar fashion, comparing a count determined between the z-pulse of its encoder 450 and the z-pulse of the virtual encoder 470 to a window taken relative to the second offset (see also FIG. 8). Again, depending on the comparison, the second drive 420 may cause the motor 156 to speed up or slow down.

To facilitate communication between the first drive 410 and the second drive 420 so as to permit communication particularly with the module 430, the first and second drives 410, 420 may be connected by a bus 480. The bus 480 may permit communication between the first drive 410 and the second drive 420 so that signals, such as the z-pulse from the virtual encoder 470, may be passed from the module 430 to the first drive 410. The bus 480 may also permit communication with a controller 500, which is in turn connected to a user input 510.

The controller 500, as well as the other controllers and drives mentioned herein, may be defined by one or more electrical circuit components, may be defined by one or more processors that may be programmed to perform the actions of the controller or drive, or in part by electrical circuit components and in part by a processor(s) programmed to perform the actions of the controller or drive. The instructions by which the processor(s) is/are programmed may be stored on a memory associated with the processor, which memory may include one or more tangible non-transitory computer readable memories, having computer executable instructions stored thereon, which when executed by the processor, may cause the one or more processors to carry out one or more actions described herein. Because the controller or drive may include one or more processors, the controller or drive configured to carry out an action may be referred to as being programmed to carry out the action with reference to those embodiments utilizing a programmable processor.

The controller 500 may be configured to transmit data along the bus 480 to the second drive 420 and the module 430. For example, the controller 500 may be configured to transmit an offset value to the second drive 420 to change an angle of attack of the vibratory apparatus 100. Additionally, the controller may be configured to change the speed of the virtual drive 460 so as to affect a change in the virtual encoder 470, with a consequential change in the speed of both of the first motor 154 and the second motor 156.

To maintain a particular angle of attack, the control system 500 may permit each of the drives 410, 420 to maintain their respective motor 154, 156 at a relatively common speed and with the z-pulses of each of the encoders 440, 450 at a particular offset relative to the z-pulse of the virtual encoder 470. Unlike the speed, the offsets maintained by the drives 410, 420 are not likely to be the same, but different. However, as long as the individual drives 410, 420 maintain their respective offsets between their encoders 440, 450 and the virtual encoder 470, a desired angle of attack will be maintained.

To change the angle of attack from a first value to a second value, the control system may permit one of the drives 410, 420 to maintain the existing offset, while changing the offset to be maintained by the other of the drives 410, 420. For example, the system 200 may permit the drive 410 to maintain the existing offset between the encoder 440 and the encoder 470. On the other hand, the system 200 (and specifically the controller 500) may transmit a new offset value to the drive 420. This has the direct consequence of the drive 420 determining that the relative relationship between the z-pulse of its associated encoder 450 and the z-pulse of the virtual encoder 470 are no longer within the acceptable window relative to each other. As a further consequence, the drive 420 will signal the motor 156 to speed up or slow down to attempt to maintain the desired offset within the acceptable window.

Figure 9:
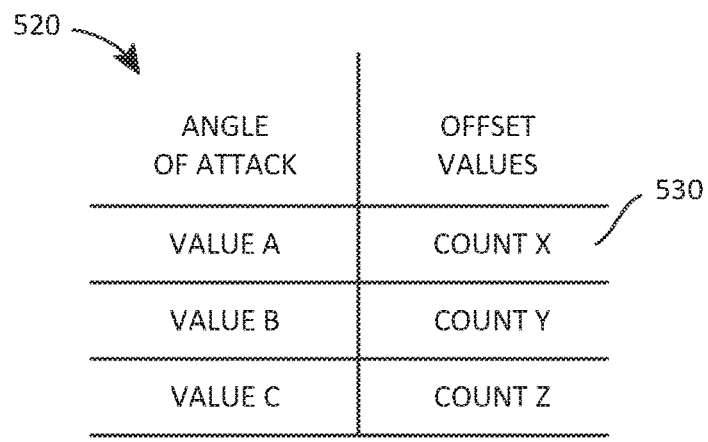
FIG. 9 is a representation of a table stored in the memory of the controller of the control system of FIG. 7.

In particular, the controller 500 may be configured to select a valve of a second offset from a table 520 stored in a memory associated with the controller 500 (represented schematically in FIG. 9), the table 520 containing a plurality of values 530 of second offsets, each value empirically determined to be associated with an angle of attack of the vibratory apparatus 100. In particular, the controller 500 may be configured to select a valve 530 of a second offset in response to an input from a user, the input associated with a desired angle of attack for the vibratory apparatus. Further, where the angle of attack is not listed in the table, the controller 500 may be configured to interpolate a value of a first offset in response to the input from a user of a desired angle of attack for the vibratory apparatus 100 where the desired angle of attack is not contained in the table 520.

To change the speed of both of the motors 154, 156, the system 200 may directly change the operation of the virtual drive 460 to affect indirectly the change. In particular, the controller 500 may provide a signal to the module 430 to change the speed of the virtual drive 460. A change in the speed of the virtual drive 460 will have an effect on the operation of the virtual encoder 470, which will experience a related change. The drives 410, 420 will thus see the change in speed of the virtual drive 460 as a change in the relationship between the z-pulses of their respective encoders 440, 450 and the z-pulse of the virtual encoder 470. When the drives 410, 420 determine that the differences between the encoders 440, 450 and the virtual encoder 470 no longer are within the acceptable window relative to the first and second offsets, respectively, the drives 410, 420 will cause the motors 154, 156 to speed up or slow down. When the drives 410, 420 again determine that the differences between the encoders 440, 450 and the virtual encoder 470 are again within the acceptable windows relative to the first and second offsets, the motors 154, 156 should both be operating at the new speed.

It should be noted that while the first and second drives 410, 420 compare their encoders 440, 450 to the virtual encoder 470 of the module 430, no data regarding the encoders 440, 450 is communicated between the drive 410 and the drive 420, or between the drive 410 and the controller 500, or between the drive 420 and the controller 500. However, because the virtual drive 460 resides in the module 430 mounted in the drive 420, and the drive 410 must have access to the virtual drive 460 over the bus 480 to perform the comparisons necessary for operation.

It will also be recognized that while the virtual drive 460 resides in the module mounted in the drive 420, the virtual drive 460 is not altered according to, for example, the count of the encoder 450. The virtual drive 460 may alter its operation in response to a signal received from the controller 500 to increase the speed of the motors 154, 156, as explained above. However, in the case of a speed change, the controller 500 would change the operation of the virtual drive 460, with a consequential change in operation of the drives 410, 420 in accordance with the change in operation of the virtual drive 460 and its related encoder 470.

Further, while the drive 420 does not control the drive 410 with a control signal sent from the drive 420 to the drive 410 to, for example, speed up or slow down the motor associated with the drive 410, the operation of the drive 420 may indirectly affect the operation of the drive 410. That is, as the drive 420 speeds up or slows down the motor 156 associated with the drive 420, this change may have a momentary effect on the operation of the motor 154 associated with the drive 410. The changing operation of the motor 154 associated with the drive 410 may result in a change in the count provided by the encoder 440, causing the drive 410 to speed up or slow down the motor 154 in response. Thus, the change is not caused by a signal passed between the drives 410, 420, but rather as a consequence of the operation of the apparatus 100 taken as a whole.

In order carry out their operations, the drives 410, 420 need to know the offset of the z-pulses of the encoders 440, 450 relative to the eccentrics 166, 170. This process may be referred to as initialization. Initialization may be carried out manually, or the process may be automated.

According to a manual method, it would be necessary to determine when the z-pulse occurs for the encoders 440, 450, and mark this relative to the shafts 158, 160. A measuring device may be used to determine the angle between the z-pulse marked on the shaft 158, 160 and the leading edge of the eccentrics 166, 170. The angle may then be converted into a count format useful with the encoders 440, 450.

Figure 10:
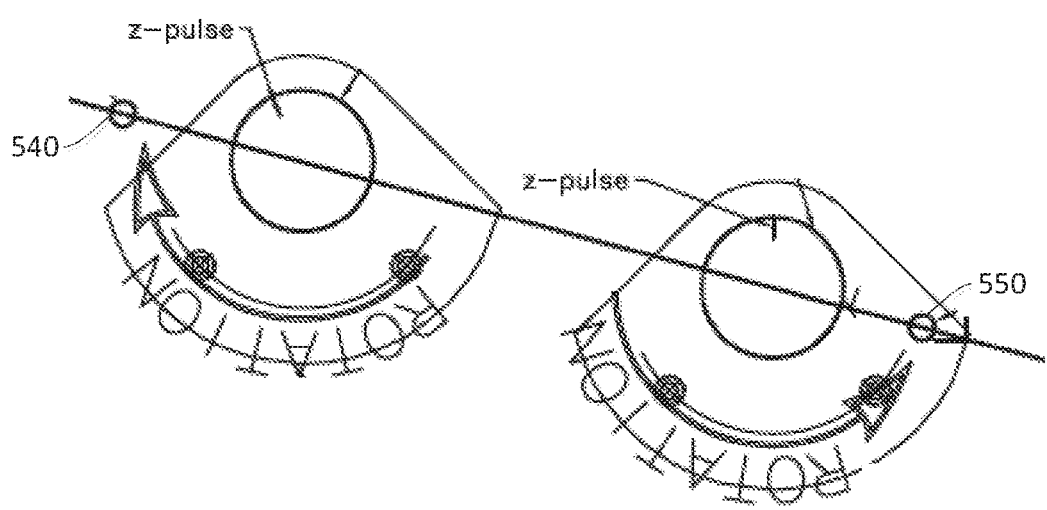
FIG. 10 is a schematic view of an automated initialization procedure usable with the control system of FIG. 7.

Alternatively, an automated system and process may be used. According to the automated system, a proximity switch 540, 550 is associated with each of the eccentrics 130, 140, as illustrated in FIG. 5. The switches 540, 550 are each coupled to one and only one of the drives 410, 420. The switches 540, 550 are used to provide a signal to the drives 410, 420 when the leading edge of the respective eccentric 166, 170 passes by the associated proximity switch for that shaft, as illustrated in FIG. 10. It will be recognized that this provides a common point of reference, corresponding to a condition wherein the eccentrics 166, 170 are in phase with each other, even though the eccentrics 166, 170 may pass through this point of reference at different times during the initialization process.

According to at least one embodiment of the present disclosure, the initialization process may be used to determine the offset maintained by one of the drives 410, 420. In particular, as noted above, a change in the angle of attack of the apparatus 100 may be achieved by maintaining the first drive 410 at a first offset and then changing the offset for the second drive 420. To further facilitate matters, the offset for the first drive 410 may be set to the offset determined during the initialization process. It will be recognized that this is merely an exemplary embodiment, and the offsets used according to other embodiments may vary.

In the alternative, an accelerometer may be used to provide feedback to control the angle of attack. An embodiment of a control system 200 utilizing an accelerometer 560, and according to certain embodiments a triaxial accelerometer, attached to the exciter assembly 104 is illustrated in FIG. 11. Because the control system 200 illustrated in FIG. 11 shares a number of structures in common with the control system 200 illustrated in FIG. 7, similar structures are numbered similarly, while the operation of those structures in FIG. 11 may differ relative to those illustrated in FIG. 7.

To begin, the system 200 is coupled to the exciter assembly 104, and in particular the first eccentric assembly 142 and the second eccentric assembly 144. In this regard, certain portions of the eccentric assemblies 142, 144 have been illustrated schematically in FIG. 11. For example, while eccentrics 166, 168 are attached to the first motor shaft 158 and eccentrics 170, 172 are attached to the second motor shaft 160, only one eccentric 166, 170 is illustrated in FIG. 11 as attached to each shaft 158, 160 to simplify the drawing.

Each motor 154, 156 is attached to a separate, variable frequency drive 410, 420. One drive 420, designated the master drive, uses an on-board function to maintain a constant speed. The other drive 410, designated the slave drive, is used as part of a feedback loop to control the angle of attack.

In this regard, the drives 410, 420 are connected to a controller 500, for example a programmable logic controller, that provides speed commands to both drives 410, 420. The controller 500 also is connected to a user input 510 and an accelerometer 560 attached to the exciter 104. The controller 500 receives a desired speed and a desired angle of attack from the user via the input 510, provides commands to the drive 420 according to the desired speed, and provides commands to the drive 510, as part of a closed-loop control system that also includes the accelerometer 560, according to the desired speed and desired angle of attack.

According to an embodiment, the controller 500 initially provides a speed command to the master drive 420. This speed command corresponds to a desired speed received from the user via the input 510. The controller 500 communicates with the master drive 420 to set the desired speed, whereupon this speed is maintained by the master drive 420 using an on-board function, for example.

The slave drive 410 also utilizes an on-board function to maintain a selected speed. The selected speed received from the controller 500 changes (around the same nominal speed given to the master drive 420) to vary the angle of attack, however.

To achieve this, the controller 500 may be configured to execute an initial time delay before executing the angle of attack. During the time delay, the slave motor 154 is intended to synchronize its speed with the speed of the master motor 156, according to principles of self-synchronization. The controller 500 may not know if the slave motor 154 has achieved the same speed as the master motor 156; rather, it may be a working assumption that after the time delay, the slave motor 154 will attain approximately the same speed as the master motor 156.

It will be added at this point that a similar procedure may be followed any time the speed of the apparatus is changed. A new desired speed would be received by the controller 500, which would send the appropriate speed command to the master drive 420. The controller 500 would then execute the time delay, during which time the master motor 156 would be controlled, using the on-board function, to achieve the desired speed, while the slave motor 154 should attain the speed according to principles of self-synchronization.

To attain and maintain a particular angle of attack, the master motor 156 will be held at a constant speed by the drive 420. The speed of the slave motor 154 will be varied according to a comparison of an angle of attack calculated using the readings from the accelerometer 560 to a desired angle of attack received from the user via the input 510. In particular, the controller 500 uses an on-board function to determine a resultant force angle from the readings of the accelerometer 560.

When it is desired to change the operation of the apparatus from one angle of attack to another, the controller 500 will compare a different desired angle of attack with the calculated angle of attack. According to the comparison, the controller 500 will command the slave motor 154 via the slave drive 410 either to speed up or to slow down. If a change in speed is provided at the same time as a change in angle of attack, the controller 500 will have to execute the time delay discussed above prior to adjusting the speed of the slave motor 154 to control the angle of attack.

According to certain embodiments, the accelerometer 560 may be a triaxial accelerometer, as mentioned above.

According to alternative embodiments, a pair of accelerometers that are attached to the exciter 104 at right angles may be used. Further, the accelerometer may be attached to the exciter 104 using a moveable platform that permits the orientation of the accelerometer to be varied relative to the exciter 104.

As a further enhancement of the control systems 200 illustrated in FIGS. 7 and 11, an accelerometer 570 may be included. This accelerometer 570 is coupled to the controller 500 and is attached to the trough assembly 102, and in particular the trough 120. The controller 500 uses the optional accelerometer 570 to compare the angle of attack of the exciter assembly 104 with the angle of attack of the trough assembly 102 to determine what, if any, modifications may be required to obtain a desired angle of attack for the trough 120. That is, when the trough 120 is loaded with material, there may be a difference between the angle of attack of the exciter assembly 104 relative to the trough assembly 102 and trough 120. By attaching a sensor to the trough assembly 102/trough 120, the differences between the angles of attack may be controlled in a closed-loop fashion such that the angle experienced by material in the trough assembly 102/trough 120 may match that provided via the input 510.

Further, while the operation of the control systems 200 discussed above has been described with reference to a single angle of attack provided via an input 510, it is also possible that the controller 500 is configured to provide multiple angles of attack in response to an input received, for example via the input 510, instead of a single angle of attack. For example, the controller 500 may control the drives 410, 420 such that the apparatus 100 provides vibration according to first angle of attack for a first period, according to a second angle of attack for a second period, and a third angle of attack (which may or may not match the first angle of attack) for a third period. For example, the apparatus may provide the first angle of attack to move the material from the first end 130 to the second end 132 of the deck 126 over the first period, provide the second angle of attack to move the material vertically over the second period, and then provide the third angle of attack again to move the material from the first end 130 to the second end 132 of the deck 126 over the third period. The input 510 may be used to change the angles of attack and/or periods either before the controller 500 begins operation of the apparatus 100, or as the controller 500 is operating the apparatus 100.

In addition to the afore-mentioned structures, the vibratory apparatus may include additional structures as well. For example, the vibratory apparatus may include a plurality of resilient members 600 disposed between the trough assembly 102 (in particular, the frame 240) and a surface to isolate the surface from the vibrations generated by the exciter assembly 104. For example, the plurality of resilient members 600 may include a plurality of marshmellow springs disposed between the frame 240 of the trough assembly 102 and the surface on which the trough assembly 102 is supported.

A vibratory conveyor according to the above embodiments thus may provide one or more of the following advantages, some of which also may have been mentioned above. By utilizing toroidal springs, the spring rate is the same in every direction, which is important where, as here, two motors are used to generate the forces applied to the second mass (the trough assembly 102) the first mass (the exciter assembly 104). Additional advantages are realized where the center of gravity of the trough assembly 102 and the center of gravity of the exciter assembly 104 are on the center of the toroid axis. This arrangement permits the driving force from the motors mounted on the exciter assembly 104 to change the angle of attack when the phase of the motor is modified to control the angle of attack.

Although the preceding text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A vibratory apparatus comprising:
    a trough assembly comprising:
        a trough, and
        first and second walls attached to the trough with a space disposed therebetween;
    an exciter assembly comprising:
        a central mount with first and second opposite sides and first and second opposite ends, and
        first and second eccentric assemblies that each include at least one motor having a shaft with a shaft axis and at least one eccentric attached to the shaft for rotation about the shaft axis, the first eccentric assembly attached to the first end of the central mount and the second eccentric assembly attached to the second end of the central mount; and
    first and second toroidal resilient members, the first toroidal resilient member disposed between the first wall of the trough assembly and the first side of the central mount and the second toroidal resilient member disposed between the second wall of the trough assembly and the second side of the central mount with the exciter assembly disposed in the space between the first and second walls.

2. The vibratory apparatus of claim 1, further comprising a control system coupled to the at least one motor of the first eccentric assembly and the at least one motor of the second eccentric assembly, and coupled to a sensor associated with one of the trough assembly and the exciter assembly, the control system configured to vary the operation of at least one motor of at least one of the first and second eccentric assemblies to change an angle of attack generated by the exciter assembly in conjunction with a feedback signal provided by the sensor.

3. The vibratory apparatus of claim 2, wherein the control system comprises a first drive coupled to the at least one motor of the first eccentric assembly, and a second drive coupled to the at least one motor of the second eccentric assembly.

4. The vibratory apparatus of claim 2, wherein the sensor comprises a first encoder attached to the shaft of the at least one motor of the first eccentric assembly, and a second encoder attached to the shaft of the at least one motor of the second eccentric assembly.

5. The vibratory apparatus of claim 4, wherein the sensor further comprises an accelerometer attached to the trough.

6. The vibratory apparatus of claim 2, wherein the sensor comprises an accelerometer attached to the exciter.

7. The vibratory apparatus of claim 6, wherein the accelerometer comprises a triaxial accelerometer.

8. The vibratory apparatus of claim 6, wherein the sensor further comprises an accelerometer attached to the trough.

9. The vibratory apparatus of claim 1, wherein the center of gravity of the trough assembly, the center of gravity of the exciter assembly and the center of the first and second toroidal resilient members are the same.

10. The vibratory apparatus of claim 1, wherein the trough assembly includes a shaft, the central mount comprises a passage that extends between the first and second sides, and the first and second toroidal resilient members each comprise a passage therethrough, and the shaft is disposed through the passage of the central mount and the passages of the first and second toroidal resilient members with the central mount disposed in the space.

11. The vibratory apparatus of claim 1, wherein the central mount has a first circular plate disposed on the first side and a second circular plate disposed on the second side, and the first resilient member has a surface that abuts the first circular plate and the second resilient member has a surface that abuts the second circular plate.

12. The vibratory apparatus of claim 1, wherein the trough has an upper surface and a lower surface, and the first and second walls are attached to the lower surface of the trough.

13. The vibratory apparatus of claim 1, wherein the trough comprises defining a deck having a longitudinal axis from a first end to a second, opposite end, and the first and second walls are parallel to the longitudinal axis of the trough.

14. The vibratory apparatus of claim 1, wherein the trough comprises defining a deck having a longitudinal axis from a first end to a second, opposite end, and the shafts of the at least one motor of the first and second eccentric assemblies are transverse the longitudinal axis of the trough.

15. The vibratory apparatus of claim 1, further comprising a plurality of resilient members disposed between the trough assembly and a surface.

* * * * *